(12) United States Patent
Sen

(10) Patent No.: US 8,238,831 B2
(45) Date of Patent: *Aug. 7, 2012

(54) WIRELESS INTERFERENCE MITIGATION

(75) Inventor: Indranil Sen, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 174 days.

This patent is subject to a terminal disclaimer.

(21) Appl. No.: 12/748,230

(22) Filed: Mar. 26, 2010

(65) Prior Publication Data

US 2011/0237188 A1 Sep. 29, 2011

(51) Int. Cl.
*H04B 1/00* (2006.01)
*H04B 15/00* (2006.01)

(52) U.S. Cl. .............. 455/63.1; 455/41.2; 455/426.1; 370/328; 370/332; 375/346

(58) Field of Classification Search .............. 455/41.1, 455/41.2, 63.1, 426.1, 450, 452, 501; 370/328, 370/332, 338; 375/346
See application file for complete search history.

(56) References Cited

U.S. PATENT DOCUMENTS

| | | | |
|---|---|---|---|
| 7,634,276 B2 | 12/2009 | Liu et al. | |
| 2003/0060206 A1 | 3/2003 | Sointula et al. | |
| 2005/0036469 A1 | 2/2005 | Wentink | |
| 2005/0276241 A1 | 12/2005 | Kamerman et al. | |
| 2007/0165754 A1 | 7/2007 | Kiukkonen et al. | |
| 2008/0181173 A1 | 7/2008 | Wei | |
| 2009/0086684 A1 | 4/2009 | Kelly et al. | |
| 2009/0143095 A1 | 6/2009 | Zhang | |
| 2009/0252122 A1* | 10/2009 | Leinonen et al. | 370/332 |
| 2009/0257379 A1* | 10/2009 | Robinson et al. | 370/329 |
| 2009/0273531 A1 | 11/2009 | Ishizuka et al. | |
| 2009/0303975 A1 | 12/2009 | Xhafa et al. | |
| 2009/0316667 A1 | 12/2009 | Hirsch et al. | |
| 2009/0318087 A1 | 12/2009 | Mattila et al. | |
| 2010/0029204 A1 | 2/2010 | Gao et al. | |
| 2011/0136530 A1 | 6/2011 | Deshpande | |

FOREIGN PATENT DOCUMENTS

| | | |
|---|---|---|
| WO | WO02/25832 | 3/2002 |
| WO | WO2007/083205 | 7/2007 |
| WO | WO2007/106678 | 9/2007 |

OTHER PUBLICATIONS

Product Information Sheet, Anritsu Corporation, "Adaptive Frequency Hopping Option for the MT8852B," Jan. 2007.
Anand Raghavan, "Interference Cancellation for Collocated Wireless Radios," available at CiteSeerX: http://citeseerx.ist.psu.edu/viewdoc/summary?doi=10.1.1.114.3422.
Xiangpeng Jing et al., "Distributed Coordination Schemes for Multi-Radio CO-existence in Dense Spectrum Environments: An Experimental Study of the ORBIT Testbed," 2008 IEEE.
Charles Hodgdon, Ericsson Technology Licensing, "Adaptive Frequency Hopping for Reduced Interference between Bluetooth® and Wireless LAN," May 2003.
U.S. Office Action dated Mar. 8, 2012 in U.S. Appl. No. 12/748,180.

* cited by examiner

*Primary Examiner* — Tuan H Nguyen
(74) *Attorney, Agent, or Firm* — Womble Carlyle Sandridge & Rice LLP

(57) ABSTRACT

Mitigating interference in a mobile wireless communication device by using an estimation of the performance impact of interfering signals generated by a wireless cellular transmitter and received by a co-located Bluetooth receiver. Bluetooth frequency channels are marked suitable or unsuitable for transmission based on the performance impact estimation and the state of the wireless cellular and Bluetooth connections. The estimation accounts for properties of the wireless cellular transmitter and Bluetooth receiver as well as operational characteristics of the wireless cellular and Bluetooth connections.

17 Claims, 9 Drawing Sheets

WIRELESS INTERFERENCE MITIGATION

CROSS REFERENCE TO RELATED APPLICATIONS

This patent application is related to co-pending U.S. patent application Ser. No. 12/748,180 entitled "WIRELESS INTERFERENCE MITIGATION" by Indranil Sen, filed concurrently herewith.

TECHNICAL FIELD

The described embodiments relate generally to wireless mobile communications. More particularly, a method is described for mitigating interference between two or more wireless transceivers in a mobile wireless communication device.

BACKGROUND OF THE INVENTION

Mobile wireless communication devices, such as a wireless cellular telephone or a wireless enabled computer tablet, can provide a wide variety of communication services including, for example, voice communication, text messaging, internet browsing, and audio/video streaming. Different communication services on mobile wireless communication devices can use one or more different communication protocols that transmit and receive in separate or overlapping bands of radio frequency spectrum. Different bands of radio frequency spectrum are allocated for different services, some strictly licensed to particular wireless operators, while other frequency bands can be open for shared common use. Ideally transmissions in one frequency band do not interfere with the reception of transmissions in another frequency band; however, the advent of mobile wireless communication devices that include multiple wireless transceivers, each configured to operate with a different communication protocol and placed in relatively close proximity to each other in the mobile wireless communication device can result in interference between them.

Mobile wireless communication devices offer short range connections to wireless accessory devices, medium range connections to wireless network access points, and long range connections to cell towers, thereby providing flexibility and near ubiquity for connecting a user to a wide array of communication services. For example, voice communications can be realized over a 3 G communication link using a global system for mobile communications (GSM) protocol or using a voice over internet protocol (VoIP) packet protocol through a wireless local area network connection. Some mobile wireless communication devices can support seamlessly transferring a communication link between connections that use different protocols. Several national and international standards organizations develop and specify communication protocols that can enable consistent performance and compatibility between products provided by different manufacturers. While each communication protocol can require that transmissions by mobile wireless communications devices using the protocol be restricted to not transmit above a defined power spectral density mask, i.e. keep radiated transmit power below certain levels across different radio frequency bands, current mobile wireless communication devices include receivers capable of detecting radio frequency signals at very low power levels. With a relatively high power transmitter located close to a sensitive receiver in the same mobile wireless communication device, providing adequate isolation between them can prove quite challenging.

Isolation between a transmitter and a receiver co-located in the same mobile wireless communication device can use specific antenna design, shielding, filtering and placement to minimize receiving interfering radio frequency power in one receiving antenna from another transmitting antenna. Current mobile wireless communication devices can be quite compact in size, and the maximum physical distance possible on such small devices between a transmitter and receiver can limit the amount of radiated radio frequency power loss resulting from antenna placement. Thus there exists a need for a method to mitigate interference between radio frequency transceivers placed in the same mobile wireless communications device.

SUMMARY OF THE DESCRIBED EMBODIMENTS

This paper describes various embodiments that relate to methods to mitigate interference between different transceivers in a mobile wireless communication device. A method to reduce interference between a first transmitter and a second receiver in a mobile wireless communication device based on estimating interference into the second receiver and coordinating transmissions by the first transmitter is described.

In one embodiment a method of mitigating interference in a mobile wireless communication device includes at least the following steps. A performance impact to signals received by a first transceiver over a first wireless connection due to interference from signals transmitted by a second transceiver over a second wireless connection is estimated. The first and second transceivers are co-located in the mobile wireless communication device. The first wireless connection is changed to not use a portion of a first frequency band used by the first transceiver based on the performance impact estimation. The estimation of the performance impact of interference between the first and second transceivers is periodically repeated while the first and second wireless connections are active. In a representative embodiment, the first wireless connection is a Bluetooth connection and the second wireless connection is a wireless cellular connection. In a further embodiment, the estimation accounts for properties of the transmitter of the wireless cellular connection and the receiver of the Bluetooth connection as well as operational characteristics of the wireless cellular and Bluetooth connections.

In another embodiment, a mobile wireless communication device comprises a first transceiver that receives signals through a first wireless connection, a second transceiver that transmits signals through a second wireless connection, and a control processor coupled to the first and second transceivers. The control processor mitigates interference in the mobile wireless communication device. The control processor estimates the performance impact of signals received by the first transceiver from signals transmitted by the second transceiver. The control processor changes the first wireless connection to not use a portion of a first frequency band based on the performance impact estimation. The estimation and change of frequency band usage is repeated periodically. In a representative embodiment the first wireless connection is a Bluetooth connection and the second wireless connection is a wireless cellular connection. In a further embodiment, the estimation accounts for properties of the transmitter of the wireless cellular connection and the receiver of the Bluetooth connection as well as operational characteristics of the wireless cellular and Bluetooth connections In yet another embodiment, a computer readable medium for tangibly storing computer program code executable by a processor for mitigating interference in a mobile wireless communication device is described. The computer readable medium includes computer program code for estimating a performance impact to signals received by a first transceiver of the mobile wireless communication device through a Bluetooth connection by signals transmitted by a second transceiver of the mobile wireless communication device through a wireless cellular connection. The computer readable medium further includes computer program code for changing the Bluetooth connection to not use a portion of a first frequency band used by the first transceiver based on the performance impact estimation. The computer readable medium also includes computer program code for periodically repeating the estimating the performance impact and changing the Bluetooth connection while the Bluetooth and wireless cellular connections are active.

BRIEF DESCRIPTION OF THE DRAWINGS

The invention and the advantages thereof may best be understood by reference to the following description taken in conjunction with the accompanying drawings.

DETAILED DESCRIPTION OF EXAMPLE EMBODIMENTS

Figure 1:
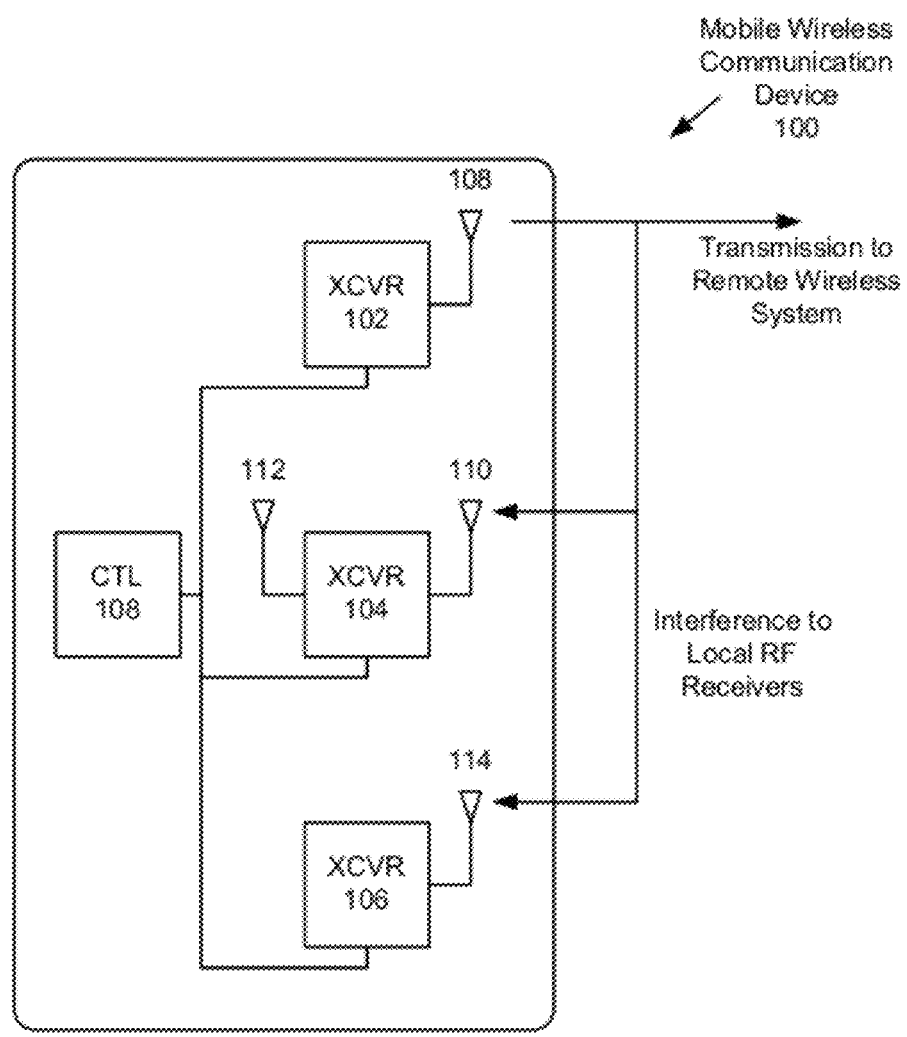
FIG. 1 illustrates a mobile wireless communication device that includes multiple radio frequency transceivers.

In the following description, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Mobile wireless communication devices, such as a wireless cellular telephone or a wireless enabled tablet computer, can provide a wide array of communication services including, for example, voice communication, text messaging, internet browsing, and audio/video streaming. Different communication services offered on mobile wireless communication devices can use one or more different communication protocols that transmit and receive in separate or overlapping bands of radio frequency spectrum. Contemporary mobile wireless communication devices can operate using several different radio frequency transmitters and receivers simultaneously, each transmitter potentially interfering with one or more of the receivers. The performance of an individual radio frequency receiver, as measured by its data rate throughput or its packet error rate, can be degraded due to interference from a co-located transmitter that outputs radio frequency power in the same (in-band) or different (out-of-band) radio frequency bands in which the radio frequency receiver can operate. Current mobile wireless communication devices can utilize multiple radio frequency transceivers (transmitter and receiver pairs) situated in close physical proximity in the device, and limitations on the form factor for these mobile wireless communication devices can limit the amount of isolation achievable between different radio frequency transceivers. Thus, optimal system performance of radio frequency reception in a mobile wireless communication device can depend on intelligent interference detection and coordinated radio frequency spectrum management between the multiple radio frequency transceivers.

Mobile wireless communication devices can include control blocks that monitor and assess the operational states of different wireless communication transceivers contained therein. When two or more wireless communication transceivers are active simultaneously, whether transmitting or receiving, the control block can determine whether one transceiver's radiated output power can interfere with a second transceiver's reception and decoding of data. An estimation of the performance impact of interference between transceivers in the mobile wireless communication device can depend on static parameters, such as knowledge of placement and design of the physical components used for radio transmission and reception in the mobile wireless communication device. The estimation can also depend on operational characteristics of the transceivers used, as well as on dynamic parameters that account for the specific operational state and connection of the transceivers. A low data rate packet connection with automatic retransmission, for example, can be influenced differently by radio frequency interference than a high data rate streaming video connection. A control unit in the mobile wireless communication device can monitor the wireless transceivers regularly to manage their transmissions to minimize interference while maintaining a desired level of quality of service for active connections.

FIG. 1 illustrates a mobile wireless communication device 100 that includes three wireless transceivers (XVCR) 102/104/106. The first transceiver 102 can transmit a wireless signal through an antenna 108 to a remotely located wireless system. In a representative embodiment, the first transceiver 102 can be a wireless cellular Global System for Mobile Communications (GSM) transceiver that transmits to a base transceiver station (BTS). As the remotely located wireless system can be at a distance from the mobile wireless communication device 100, the transmitted signal from the transceiver 102 can have significant power levels. The additional second and third transceivers 104/106 in the mobile wireless communication device 100 can receive a part of the signals transmitted by the first transceiver 102, including when the transceivers 102/104/106 operate in different frequency bands. In a representative embodiment, the second transceiver 104 can be a wireless local area network (WLAN)

transceiver 104, and the third transceiver can be a Bluetooth (BT) transceiver 106. All three transceivers 102/104/106 can be connected to a control unit 108. While representative embodiments using GSM, WLAN and BT transceivers are described herein, no particular limitation is implied for the claimed embodiments. Other wireless communication transceivers can also generate self-interference among each other and therefore benefit from interference mitigation as disclosed herein.

Wireless cellular transceivers can provide long range connections to cell towers located up to several kilometers away, while WLAN and Bluetooth transceivers can provide medium range (less than 100 meter) and short range (less than 10 meter) connections respectively. Each of the transceivers 102/104/106 in the mobile wireless communication device 100 can include processing units that convert digital data into analog signals to transmit out from an antenna to remotely located wireless systems (not shown). The transceivers 102/104/106 can also process analog signals received from the remotely located wireless systems into digital data that can be further processed and output to a user of the mobile wireless communication device 100. Each transceiver in the mobile wireless communication device 100 can include its own antenna system that radiates and captures radio frequency (RF) energy designed for one or more specific wireless communication protocols that use certain ranges (bands) of radio frequency spectrum. For example, in representative embodiments, the first transceiver 102 can be a wireless cellular GSM transceiver and can use bands of RF spectrum near 850, 900, 1800 or 1900 MHz, while the second transceiver 104 can be a WLAN transceiver and can use RF bands near 2.4 or 5 GHz. The third transceiver 106 can be a BT transceiver 106 and can also use a range of RF spectrum near 2.4 GHz. The nominal "in-band" RF spectrum transmitted by the first transceiver 102 can be restricted to a range of radio frequencies that does not overlap the RF spectrum received by the second transceiver 104 and the third transceiver 106; however, significant "out-of-band" RF power can be transmitted outside of the nominal RF spectrum and can impact the performance of nearby RF transceivers. The radio frequency power transmitted by the first transceiver 102 to a remote wireless system located at a significant distance (several km away) from the mobile wireless communication device 100 can be output at a relatively high level and therefore include detectable transmit power that can leak into and interfere with reception of RF signals by the local transceivers 104/106.

A primary protection of the second and third transceivers 104/106 in the mobile wireless communication device 100 can be isolation between the first transceiver antenna 108 and the second/third transceiver antennas 110/114. Small form factors for the mobile wireless communication device 100, however, can limit the amount of isolation possible between the antennas. Newer communication protocols, such as multiple-input multiple-output (MIMO) modes of IEEE 802.11n, can also use multiple antennas, such as shown for the second transceiver 104 with two antennas 110/112. Multiple antennas can make physical isolation between antennas used by different communication protocols even more difficult in a smaller mobile wireless communication device 100. To minimize interference, the first transceiver 102 can include transmit filtering that limits transmitted power in "out of band" frequency bands; however, the level of filtering required to eliminate interference into nearby receivers can be impractical to realize. For example, a GSM transceiver can transmit at levels between approximately 0 and +33 dBm "in band" (i.e. within the nominal transmit frequency spectrum), while a WLAN transceiver and a BT transceiver can detect received signals at a level of −98 dBm and −91 dBm respectively (within their own band frequency spectrum, which is "out of band" with respect to the GSM transceiver). Transmit frequency spectrum roll-off between the "in band" and "out of band" frequency spectra and additional transmit filtering by the GSM transceiver can provide more than 70 dB of isolation, but an additional of approximately 30 to 70 dB of isolation can be required to lower the GSM transmit signal to a level that does not impact the performance of highly sensitive WLAN and BT receivers. Such large additional isolation can be difficult to achieve in mobile wireless communication devices with relatively small form factors.

Figure 2:
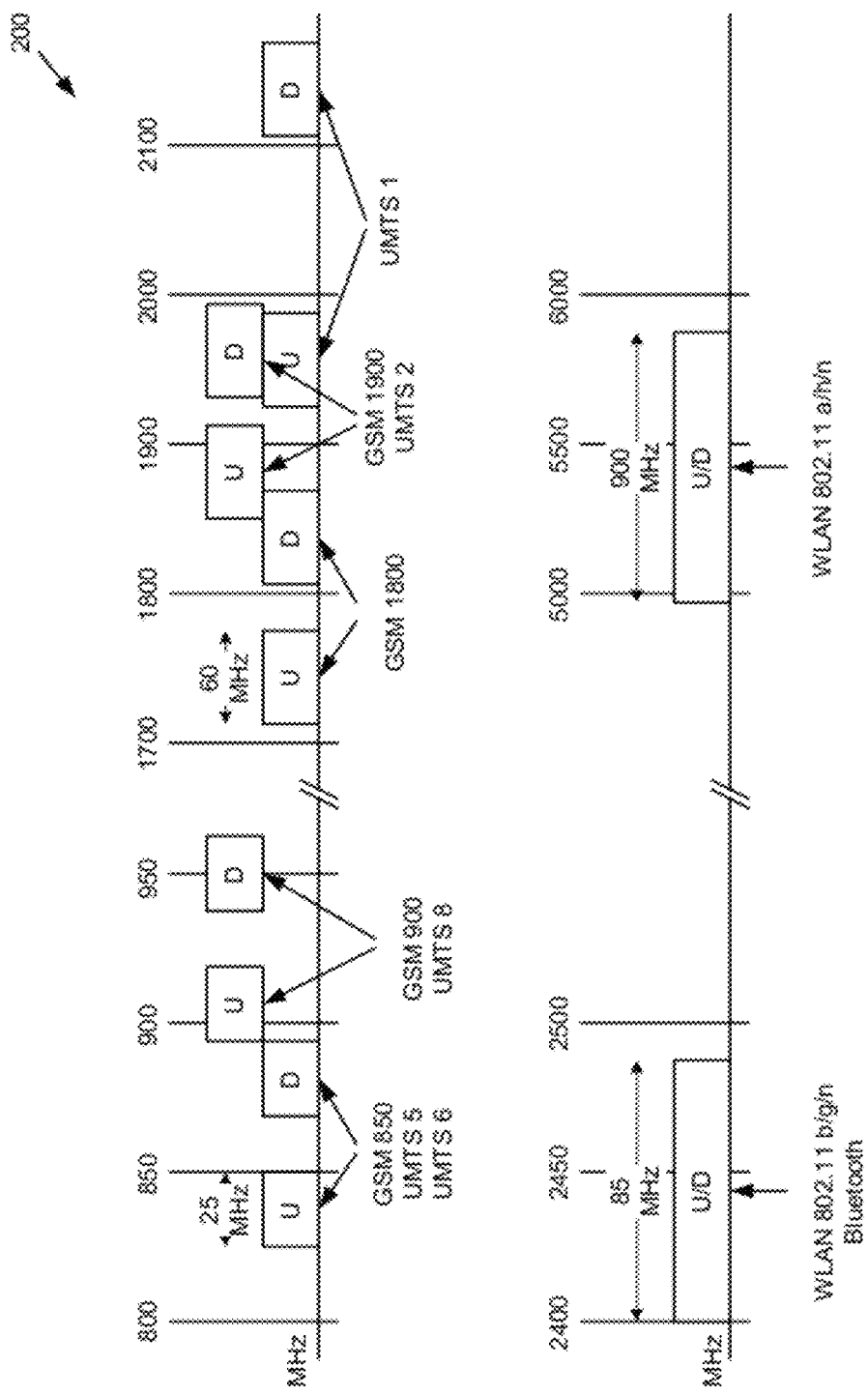
FIG. 2 illustrates radio frequency band allocations used for several different standardized wireless communication protocols.
Figure 3:
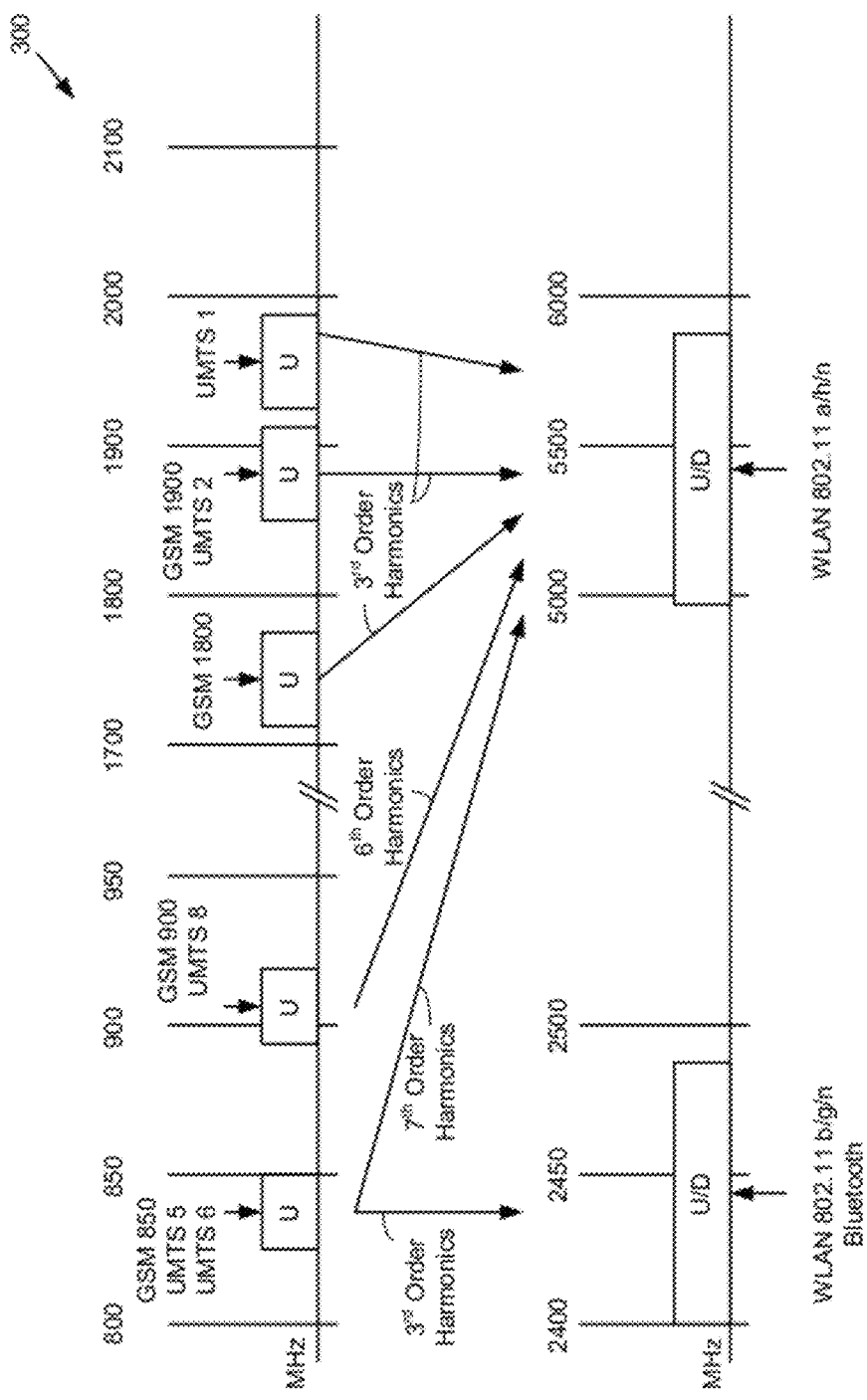
FIG. 3 illustrates higher order harmonic radio frequency interference from lower radio frequency bands of wireless cellular mobile transmissions into higher radio frequency bands used by Bluetooth and wireless local area network receivers.

FIG. 2 illustrates several different frequency bands that can be used by third generation (3G) GSM and UMTS (Universal Mobile Telecommunications System) communication protocols. GSM can operate in four distinct pairs of frequency bands at approximately 850, 900, 1800 and 1900 MHz. Each pair of frequency bands near 850 and 900 MHz include a first 25 MHz band for communication from the mobile wireless communication device 100 to a BTS in the "uplink" direction and a second 25 MHz band for communication to the mobile wireless communication device 100 from the BTS in the "downlink" direction. Each 25 MHz frequency band can be further divided into 124 separate frequency channels having a nominal bandwidth of 200 kHz each. When transmitting to a BTS, a mobile wireless communication device 100 can periodically send bursts of radio frequency energy by modulating a frequency carrier in one of the 124 uplink frequency channels. Third order harmonics of the transmitted GSM uplink signal can fall within the 2.4 GHz frequency band that spans a bandwidth of approximately 85 MHz used by the WLAN and BT transceivers 104/106 in the same mobile wireless communication device 100. (A third order harmonic of a transmit signal centered at 825 MHz can be centered at 3×825=2475 MHz.) The third order harmonics of the GSM uplink signal can be sufficiently high to interfere with reception of WLAN or BT signals in the WLAN/BT transceivers. (Common WLAN communication protocols include 802.11b/g/n that use the 2.4 GHz band and 802.11a/h/n that use the 5 GHz band as indicated in FIG. 2.) As with a GSM 850 transmitter, higher order harmonics can be generated by transmitters in the GSM transceiver 102 (or a UMTS transceiver) that use frequency channels in the GSM 900, GSM 1800 and GSM 1900 frequency bands. For example, seventh order harmonics of GSM frequency channels near 825 MHz and third order harmonics of GSM frequency channels near 1800 MHz and 1900 MHz can interfere with WLAN signals using the 5 GHz frequency band. (7×825=5775 MHz, 3×1800=5400 MHz, 3=1900=5700 MHz.). FIG. 3 illustrates examples in which several different higher order harmonics generated by GSM/UMTS bands can interfere with reception of signals in the 2.4 GHz WLAN/BT frequency band and in the 5 GHz WLAN frequency band.

Figure 4:
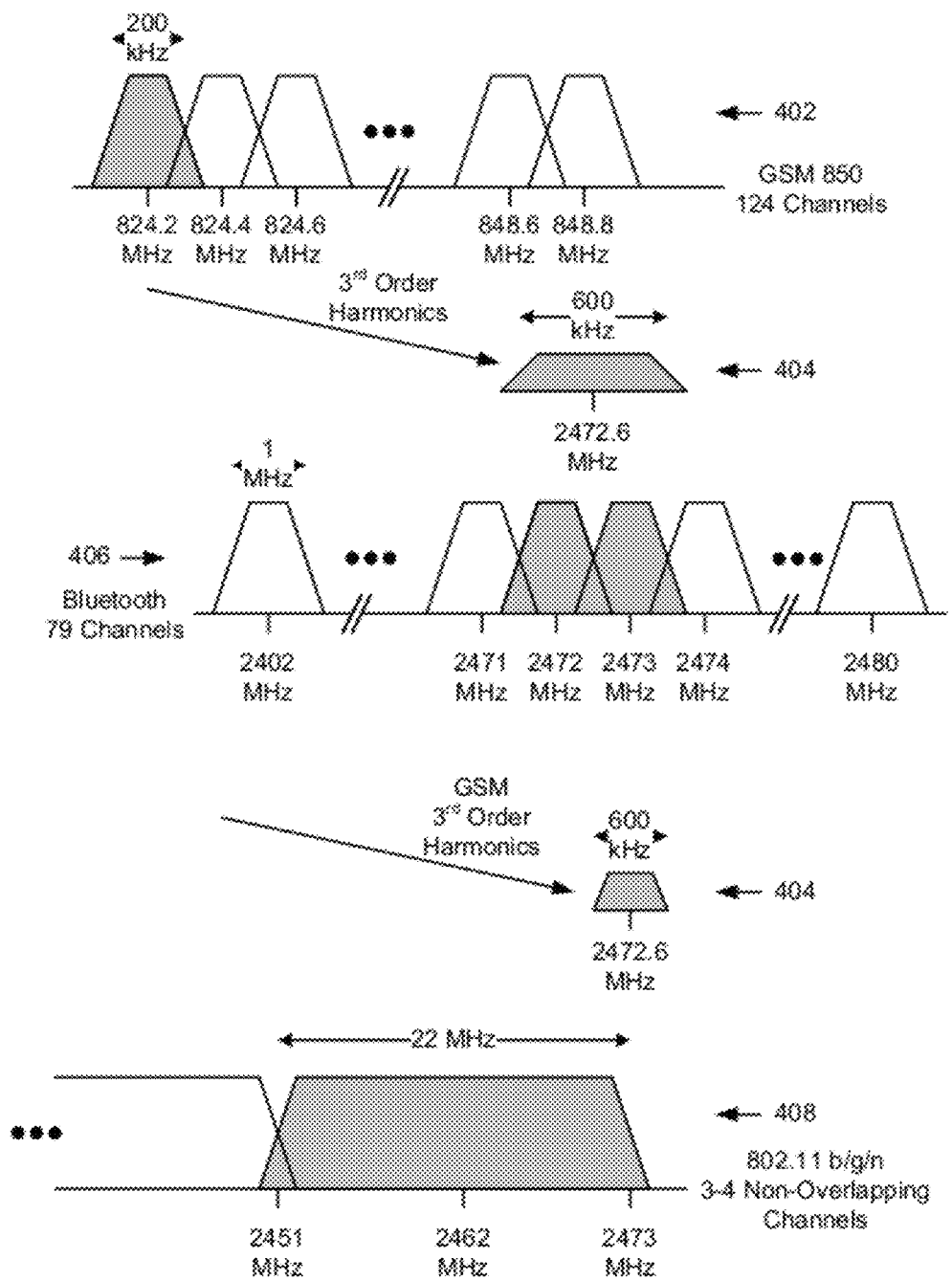
FIGS. 4 and 5 illustrate representative radio frequency interference between a mobile wireless cellular communication transmitter and one or more Bluetooth and wireless local area network receivers.
Figure 5:
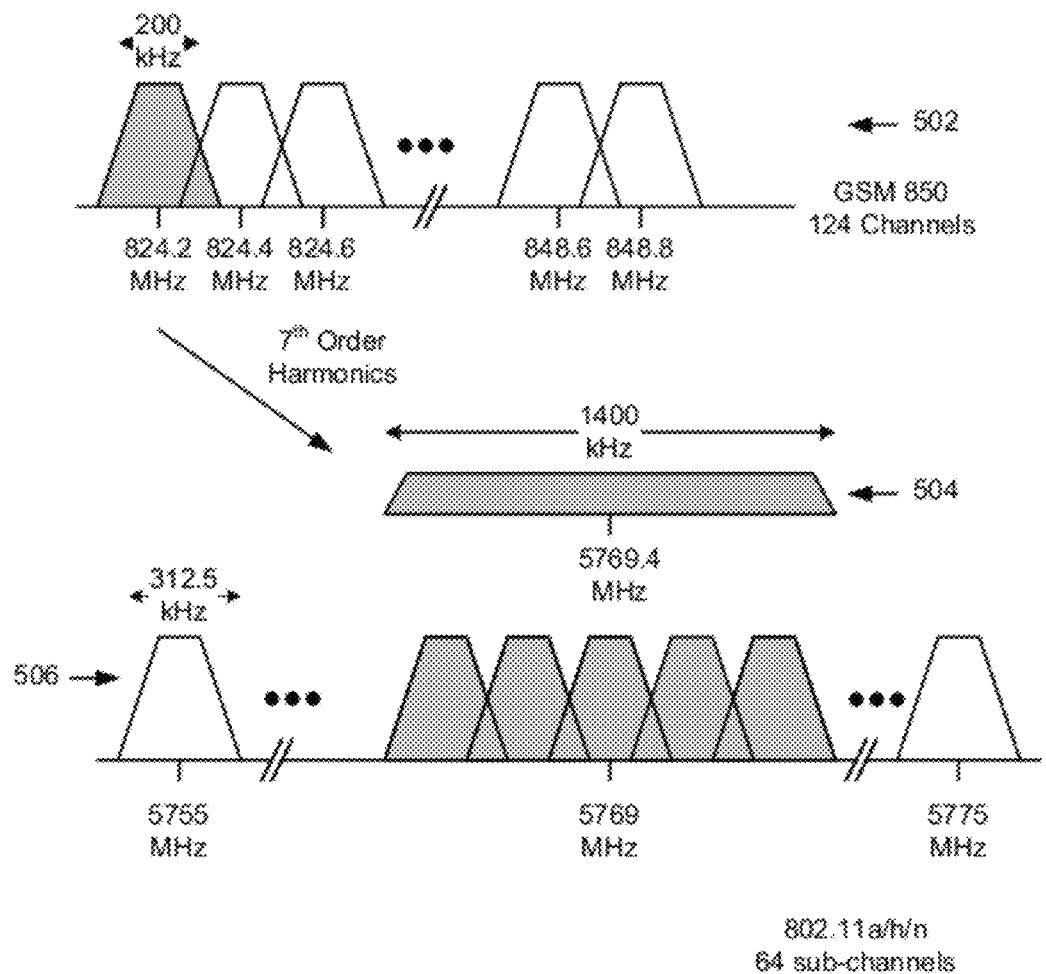

FIGS. 4 and 5 provide additional specific illustrations of interference that can be generated by a GSM transmitter into co-located Bluetooth and WLAN receivers in a mobile wireless communication device 100. The GSM 850 uplink frequency band 402 can include 124 different RF channels, each RF channel centere at a different carrier frequency and having a nominal bandwidth of 200 kHz. A GSM transmitter outputting energy on the frequency channel centered at 824.2 MHz can produce third order harmonics 404 having a nominal bandwidth of 600 kHz (three times wider) centered at 2472.6 MHz (three times higher in frequency). These third order harmonics can be significantly lower in power than the primary frequency band of the GSM 850 transmit signal (due to a combination of transmit frequency roll-off, transmit filtering and radiated power loss), but the third order harmonics can be comparable or higher in power than Bluetooth signals received in the 2.4 GHz band 406 from a remote wireless accessory device.

The Bluetooth communication protocol specifies 79 independent RF channels, each RF channel spaced 1 MHz apart from 2402 MHz to 2480 MHz. A Bluetooth transmitter can frequency hop between the 79 different channels on successive transmission bursts, thereby providing a measure of frequency diversity that avoids continuous interference transmitting at a fixed frequency. Only for a fraction of transmit time can the Bluetooth transmitter use each RF channel, and thus transmissions on other RF channels can be received free from that particular interference. As shown in FIG. 4, the third order harmonics 404 of the GSM 850 transmit channel can interfere with Bluetooth channels at 2472 and 2473 MHz. The Bluetooth transceiver 106 can observe this interference over time and adaptively avoid using an RF channel that receives such interference; however, Bluetooth transmissions received before adaptively moving away from these RF channels can be corrupted. A system that marks the Bluetooth RF channels prone to interference as "unsuitable" for communication based on an estimation of the interference that can be generated by the GSM transmitter (for example, before the Bluetooth receiver detects the interference) can provide improved performance in mobile communication devices that use both GSM and Bluetooth transceivers simultaneously. Anticipating that interference can occur between transceivers in the same mobile wireless communication device and mitigating the potential interference before it occurs can increase throughput and stability of RF reception. As shown in FIG. 4, The GSM third order harmonics 404 can also interfere with a portion of the 802.11b/g/n frequency band 408 that occupies the 22 MHz wide frequency range between 2451 MHz and 2473 MHz.

As illustrated by FIG. 5, higher $7^{th}$ order harmonics of a GSM transmit signal can produce a "7 times" wider bandwidth interference signal 504 that can interfere with wireless local area network protocols that use the 5 GHz frequency band. The GSM 850 channel at 824.2 MHz can produce a seventh order harmonic 504 at 5769.4 MHz with a bandwidth of 1400 kHz. The IEEE 802.11a/h/n protocol specifies a 20 MHz region of bandwidth between 5755 MHz and 5775 MHz that can include 64 different parallel RF sub-channels, each occupying 312.5 kHz of bandwidth. The 64 RF sub-channels can be transmitted simultaneously using an orthogonal frequency division multiplexing (OFDM) modulation scheme. The 1400 kHz wide seventh order harmonics 504 from the GSM 850 transmit signal can interfere with five of these parallel sub-channels in the 5 GHz WLAN frequency band. Unlike the individual Bluetooth sub-channels that can be selectively disabled, all of the 64 parallel sub-channels in the 802.11a/h/n transmit spectrum can be used simultaneously. To avoid higher order harmonic interference from the GSM transmitter, the 802.11a/h/n connection can shift all sub-channel frequencies entirely to a different 20 MHz wide band of spectrum. (For example shift from using the 5755 to 5775 MHz frequency band to using the 5735 to 5755 MHz frequency band.) Thus, a relatively narrow band of interference (1400 kHz wide) from a GSM transmitter (200 kHz wide) can result in an undesirable non-use of a large band (20 MHz wide) of wireless network radio frequency spectrum, most of which did not receive interference.

Figure 6:
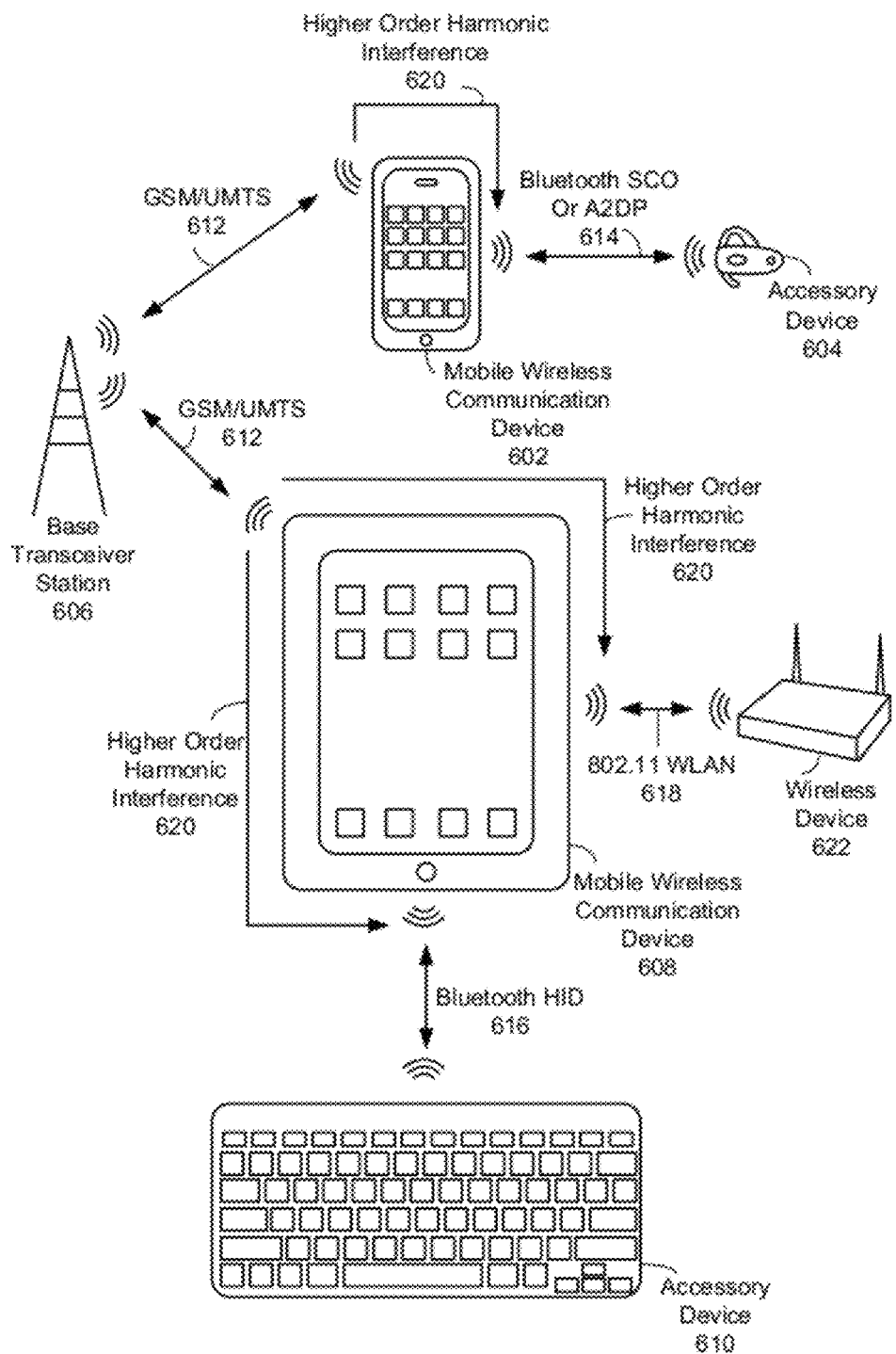
FIG. 6 illustrates two representative mobile wireless communication devices connected simultaneously to several wireless systems that use different wireless communication protocols.

FIG. 6 illustrates two mobile wireless communication devices 602/608 that can communicate using multiple RF communication protocols in representative typical use scenarios. Mobile wireless communication device 602 can connect to a base transceiver station 606 through a GSM/UMTS link 612 and simultaneously connect to an accessory device 604 through a Bluetooth link 614. The GSM/UMTS link 612 can be used for real time voice communication, and the Bluetooth link 614 can be configured to operate in a "synchronous connection-oriented" (SCO) mode to communicate the voice signals to and from the accessory device 604. The Bluetooth link 614 can also be configured to operate using an "advanced audio distribution profile" (A2DP) to communicate audio signals with the accessory device 604. The Bluetooth SCO or A2DP link 614 can typically be used for time sensitive data transfer, such as for a voice or real-time audio connection, and no error correction or re-transmission can be applied. Thus the Bluetooth SCO or A2DP link 614 from the accessory device 604 can be susceptible to higher order harmonic interference 620 generated by the GSM/UMTS 612 link at the mobile wireless communication device 602. Interference into a Bluetooth receiver in the mobile wireless communication device 100 can be perceived by a user as audible noise in the real time voice communication.

Performance of the Bluetooth SCO or A2DP link 614 between the mobile wireless communication device 602 and the accessory device 604 can be measured using a standardized audio quality metric known as a "mean opinion score" (MOS) or can be estimated by a simulation known as a perceptual evaluation of speech quality (PESQ) score. MOS values and PESQ scores can be represented on a scale from 1 (worst) to 5 (best) with an acceptable quality value set at a certain threshold, e.g. >3.7 can be considered adequate. An automated assessment of audio quality under different interference scenarios between two transceivers in the mobile wireless communication device 602 can be tested. Different transmit carrier frequencies and transmit power levels for the GSM/UMTS signal and different path losses for the Bluetooth SCO or A2DP signal can be assessed for a given mobile wireless communication device design to determine the extent of RF interference between the transceivers. The mobile wireless communication device 602 used for handheld voice communication can be relatively small in size, and thus the transmitter for the GSM/UMTS link 612 can be close to the receiver for the Bluetooth SCO or A2DP link 614, thus prone to interference.

The multi-functional mobile wireless communication device 608 illustrated in FIG. 6 shows two different possible interference paths that can typically occur between different transceivers in the device. As with the handheld mobile wireless communication device 602, the mobile wireless communication device 608 can communicate with the base transceiver station 606 through a GSM/UMTS link 612. The GSM/UMTS link 612 can cause higher order harmonic interference 620 with a Bluetooth connection 616 to an accessory device 610, e.g. a keyboard, and to an 802.11 wireless local area network connection 618 to a wireless device 622, such as a WLAN access point. The Bluetooth connection 616 can use a "human interface device" (HID) profile with an asynchronous connectionless link (ACL) in place of the Bluetooth SCO or A2DP link 614 shown for the mobile wireless connection device 602. The Bluetooth HID link 616 between the keyboard accessory device 610 and the mobile wireless communication device 608 can be tested for higher order harmonic interference 620 from transmissions by the GSM/UMTS link 612 by counting the number of incorrectly received data packets, or similarly the number of keystrokes missed. The performance of the Bluetooth HID link 616 can be tested using different Bluetooth transmit power levels (e.g., to simulate different distances between the mobile wireless communication device 608 and the accessory device 610)

and different GSM/UMTS transmit power levels against a reference Bluetooth HID connection with no interference present. A desired performance level of the Bluetooth HID link 616 when interference occurs can be based on a threshold determined by comparing against performance in which there is no interference.

Figure 7:
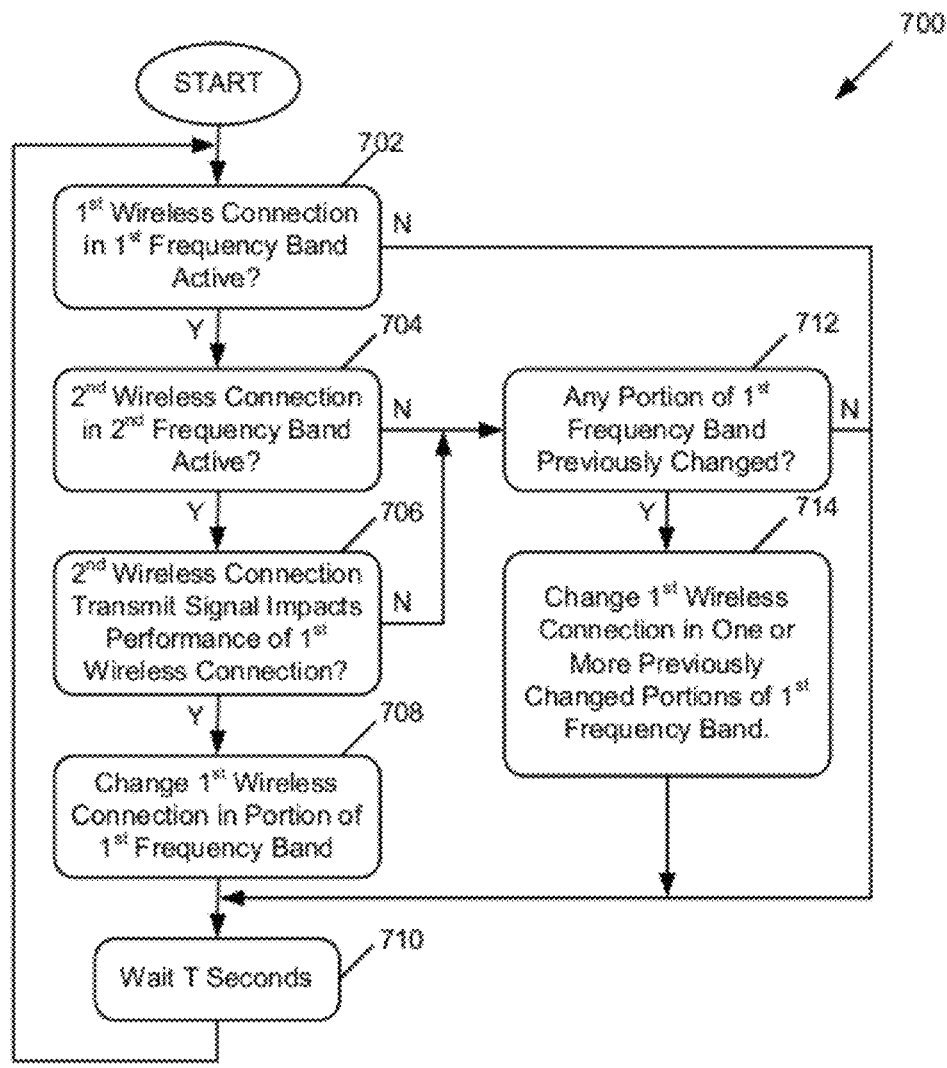
FIG. 7 illustrates a representative method to mitigate interference between a transmitter and a receiver that each use different wireless communication protocols in different radio frequency bands co-located in the same mobile wireless communication device.

FIG. 7 illustrates a representative method 700 to mitigate interference between a transmitter and a receiver that use different wireless communication protocols in different radio frequency bands co-located in the same mobile wireless communication device 100. In step 702, the mobile wireless communication device 100 determines if a first wireless connection that uses a first frequency band is active. It can be desired that a minimum level of performance can be achieved when using the first wireless connection in the presence of interference into the first frequency band. If there is no wireless connection in the first frequency band, then after a delay of T seconds in step 710, the method cycles to repeat step 702 monitoring for a first wireless connection. If there is a first wireless connection in the first frequency band, then in step 704 the mobile wireless communication device 100 determines if there is a second wireless connection using a second frequency band that is also active. The first frequency band used by the first wireless connection and the second frequency band used by the second wireless connection can be separate non-overlapping frequency bands. In a representative embodiment, the first frequency band can be at a higher frequency than the second frequency band, and higher order harmonics from at least a portion of the second frequency band can overlap with at least a portion of the first frequency band. If both the first and second wireless connections are active, then in step 706, the mobile wireless communication device 100 can estimate if the second wireless connection's transmit signal out from the mobile wireless communication device 100 can impact the performance of receiving and decoding signals into the mobile wireless communication device 100 that use the first wireless connection.

The evaluation of the performance impact of the second wireless connection's transmitter into the first wireless connection's receiver can be based one or more different criteria. The evaluation criteria can be relatively static, such as based on a given physical design and placement of radio frequency components in the mobile wireless communication device 100, or dynamic, such as based on the operating characteristics of a specific first and second wireless connection. Examples of static evaluation criteria include the amount of radio frequency antenna isolation between the transmitter using the second frequency band into the receiver using the first frequency band and the sensitivity of the first frequency band's receiver. The antenna isolation can be based on the design and performance of the components used and their physical placement relative to one another in the mobile wireless communication device 100. The sensitivity of the first frequency band's receiver can be determined by the component's inherent noise floor and the signal processing capability available to extract received signals in the presence of interfering noise. A standard Bluetooth protocol can require a receiver sensitivity of at least −70 dBm; however, some current Bluetooth receivers can achieve better than −90 dBm sensitivity. The performance criteria can depend on standards requirements or on actual designs (or a combination of both).

The criteria by which to evaluate interference can also include an amount of transmit power and a type of modulation being used by the transmitter in the second frequency band. These transmission characteristics can affect the power spectral density level (height) and nominal bandwidth (width) of the primary lobe of transmit spectrum as well as of the amount of higher order harmonics that can result in interference for a receiver using the first frequency band. The width of the interference spectrum can be estimated for different higher order harmonics, each of which can fall into a different range of frequencies, with the width of the interference being proportional to the "order" of the harmonics being evaluated. The potential impact of interference to the first frequency band's receiver can also depend on how the second frequency band is used. Intermittent transmission in the second frequency band can have a different performance impact than a continuous transmission, and certain applications can determine the transmission type. Similarly the performance impact of the interference can depend on how the first frequency band is used. Certain connections can be more sensitive to interference than others or require a different level of performance. For example, a real time streaming video connection can require a high performance level as an error can be clearly noticeable to a user of the connection and re-transmission opportunities can be limited. A file transfer protocol connection with a high level of error protection, error checking and re-transmission without real time constraints can require a lower performance level. Thus how the first wireless connection is used can influence the interference evaluation criteria.

If, in step 706, the mobile wireless communication device 100 determines that the second wireless connection that transmits in the second frequency band can impact the performance of the first wireless connection receiving signals in the first frequency band, then the mobile wireless communication device 100 can change the first wireless connection in at least a portion of the first frequency band. Interference can be received in a narrow portion of the first frequency band, and those frequencies susceptible to interference can be avoided for communication on the first wireless connection. Thus some bands of frequency can be deleted from use, at least temporarily, while the second wireless connection is active and interfering with transmissions on those frequencies. Alternatively, the mobile wireless communication device 100 can shift the frequency band used by the first wireless connection to a completely different set of frequencies less susceptible to interference from the transmitter that uses the second frequency band.

If the mobile wireless communication device 100 determines in step 706 that the second wireless connection's transmit signal does not impact the performance of the first wireless connection, then the mobile wireless communication device 100 in step 712 can determine if any portion of the first frequency band was previously changed. For example, a portion of the first frequency band can now be available for the first wireless connection to use, if the second wireless connection's transmitter has changed in which frequencies it transmits. Certain frequencies can be clear from interference presently, even though they were previously impacted. In step 714, the mobile wireless communication device 100 can take advantage of the improvement in performance in the first frequency band to change the first wireless connection. Portions of the first frequency band previously blocked can be recaptured to increase the available bandwidth for transmissions in the first frequency band.

In step 710, after testing for performance impacts and changing use of the first wireless connection, the mobile wireless communication device 100 can wait a period of T seconds before cycling back to repeat the interference evaluation. The amount of delay (T) can depend on the powered state of the mobile wireless communication device 100. For example, if the mobile wireless communication device 100 is connected to an AC power supply, then the frequency of evaluation can differ from when the mobile wireless communication device 100 is powered solely by an internal battery supply. To conserve power consumption when battery operated, the mobile wireless communication device 100 can reduce the frequency of evaluation cycles by increasing the value of the delay (T).

Figure 8:
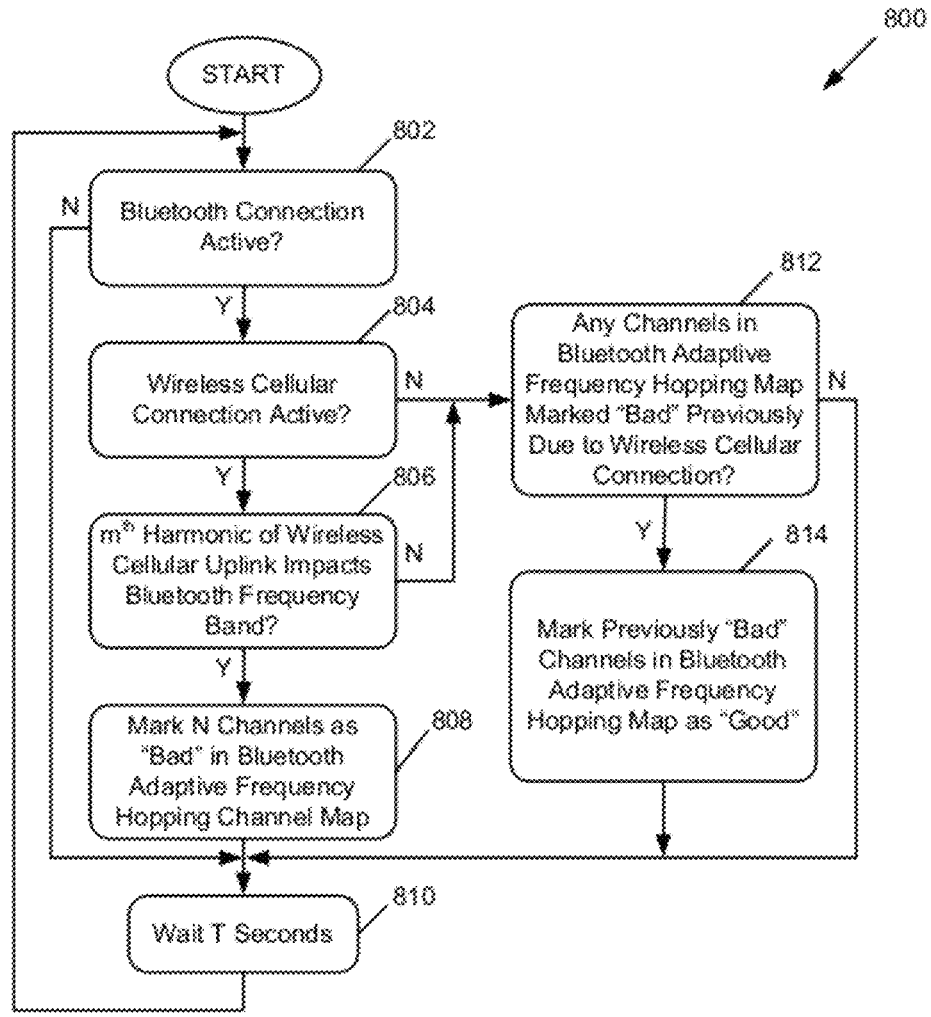
FIG. 8 illustrates a representative method to mitigate interference between a wireless cellular transmitter and a Bluetooth receiver in a mobile wireless communication device.

FIG. 8 illustrates a representative embodiment of the interference evaluation and mitigation method shown in FIG. 7 when the first wireless connection uses a Bluetooth communication protocol and the second wireless connection uses a wireless cellular (e.g. GSM or UMTS) communication protocol. In steps 802 and 804 respectively, the mobile wireless communication device 100 determines whether the Bluetooth and wireless cellular connections are active. If the mobile wireless communication device 100 is simultaneously transmitting on the wireless cellular connection and receiving on the Bluetooth connection, then interference between the connections can occur. In step 806, the mobile wireless communication device 100 evaluates if harmonics of the primary transmit band of the wireless cellular connection's uplink to the base transceiver station impacts transmissions in the Bluetooth frequency band. Different values for m (order of harmonics) can be evaluated for their potential performance impact on frequencies in the Bluetooth frequency band. If certain frequencies of the Bluetooth frequency band can be impacted in performance by the wireless cellular connection, then the mobile wireless communication device 100, in step 808, can mark those frequencies as "bad", i.e. not available for use, in an adaptive frequency hopping map.

As described earlier, Bluetooth can transmit on any of 79 different frequencies, typically hopping among a subset of 20 of these frequencies for successive transmission bursts. Not all frequencies are therefore required in a Bluetooth connection, and the Bluetooth adaptive frequency hopping map can determine which frequencies are used. The adaptive frequency hopping map can be updated periodically to account for changing conditions for transmission and reception on the Bluetooth connection. The evaluation of interference can be repeated every T seconds as shown by step 810. If the mobile wireless communication device 100 determines in step 806 that no interference can be incurred in the Bluetooth frequency band by higher order harmonics of the wireless cellular uplink, then the mobile wireless communication device 100 can examine the adaptive frequency hopping map in step 812. Certain frequencies in the adaptive frequency hopping map can have been marked "bad", i.e. unsuitable for communication, based on a previous wireless cellular interference evaluation cycle. The formerly "bad" Bluetooth frequency channels can be marked as "good" thereby recapturing bandwidth for Bluetooth transmission and reception. In some instances, not all frequency channels can be cleared in step 814, as some frequency channels can be marked as "bad" for reasons other than interference from the wireless cellular connection.

When determining whether the wireless cellular connection can interfere with the Bluetooth connection in step 806, the mobile wireless communication device 100 can base the evaluation on a number of different characteristics of the Bluetooth connection. For example, the interference can depend on the power control state of the Bluetooth connection, as the power of the received signal at the mobile wireless communication device 100 can vary. The evaluation can also depend on the number of Bluetooth frequency channels available for transmission. If a large number of Bluetooth frequency channels are already marked as "bad", then the threshold for interference can be set higher to ensure a minimum number of Bluetooth frequency channels remain available. The Bluetooth connection state, such as whether the connection is actively transmitting versus in an inquiry, page or sniff mode can also influence the threshold for interference, as active connections can be more prone to an impact in performance due to interference. As mentioned above, the Bluetooth connection can use different packet types, ACL or SCO, which can affect the level at which interference impacts performance. Similarly the interference impact evaluation can depend on the specific Bluetooth profile used by the Bluetooth connection. Audio connections can require a higher level of performance than a keyboard connection for example. Any of these different criteria can be considered alone or in combination when determining if the wireless cellular connection can impact the performance of the Bluetooth connection.

Figure 9:
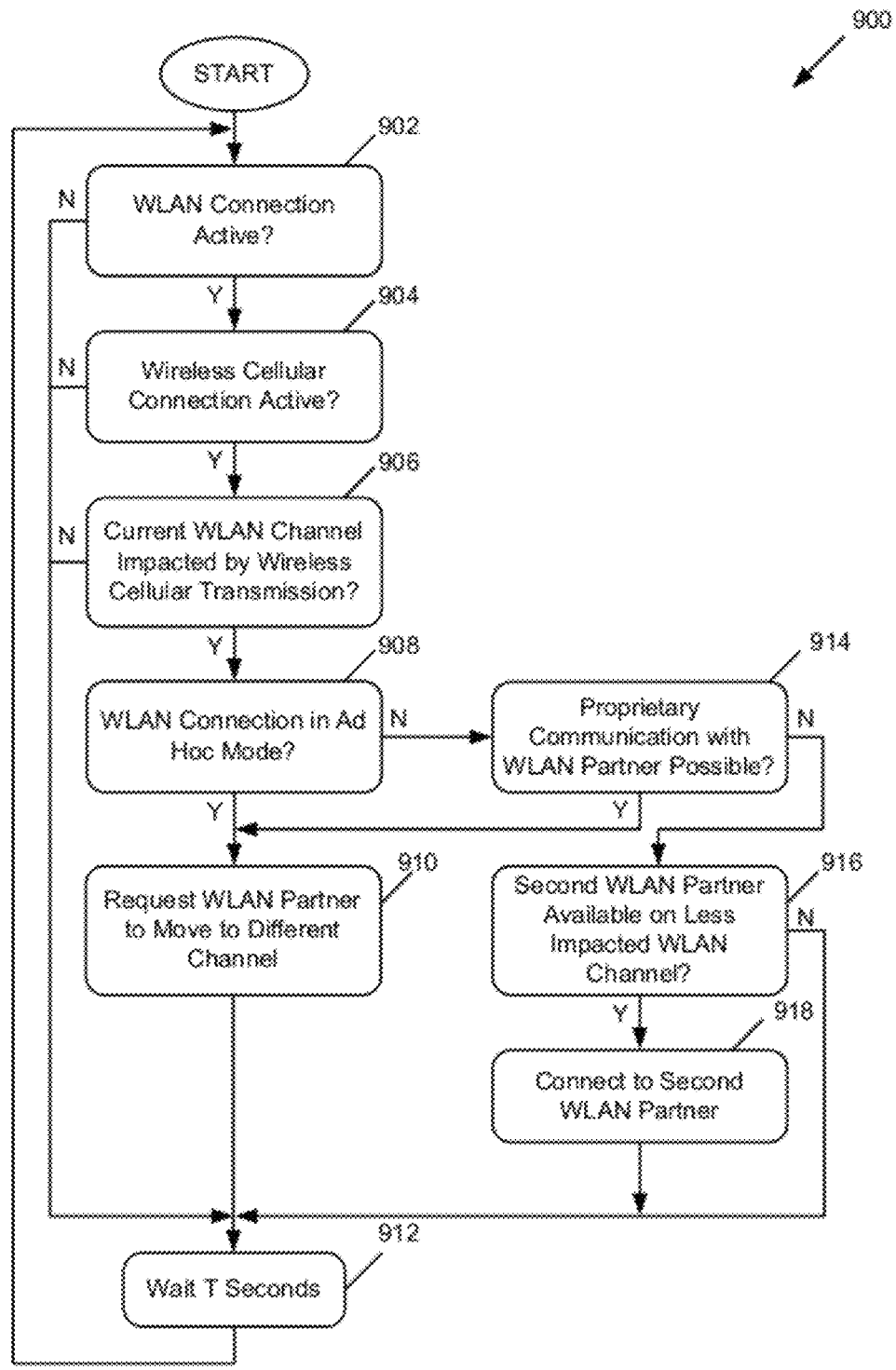
FIG. 9 illustrates a representative method to mitigate interference between a wireless cellular transmitter and a wireless local area network receiver in a mobile wireless communication device.

FIG. 9 illustrates a representative embodiment of the interference evaluation and mitigation method shown in FIG. 7 when the first wireless connection uses a wireless local area network (WLAN) communication protocol and the second wireless connection uses a wireless cellular (e.g. GSM or UMTS) communication protocol. In step 902, the mobile wireless communication device 100 determines if the WLAN connection is active. If not, then the mobile wireless communication device 100 waits T seconds in step 912 before repeating the cycle. If the WLAN connection is active, then the mobile wireless communication device 100 determines in step 904 whether in the wireless cellular connection is active. If not, again the mobile wireless communication device delays T seconds in step 912 before repeating. If both the WLAN and wireless cellular connections are active then interference between them can occur.

In step 906, the mobile wireless communication device 100 evaluates if the current WLAN channel in use can be impacted by uplink transmissions on the wireless cellular connection. As with testing for the performance impact of wireless cellular into Bluetooth connections, the evaluation of interference by the wireless cellular into WLAN connections can depend on a number of characteristics of the wireless connections in use such as wireless cellular transmit power levels, wireless cellular modulation type and WLAN modulation type (e.g. direct sequence spread spectrum WLAN can be less susceptible to interference than OFDM). The performance impact of interference can also depend on the specific WLAN connection state (e.g. whether data is being transferred), quality of service (QOS) mode, and the sensitivity of the WLAN receiver. As also described for Bluetooth connections, the mobile wireless communication device 100 can determine the cycle time for evaluation of interference (value of T) based on the powered state (battery or AC) of the mobile wireless communication device 100 and on the amount of reserve energy stored in the battery is available.

If the performance of reception through the current WLAN channel can be impacted by interference from the wireless cellular transmissions, then the mobile wireless communication device 100 can determine how to change the radio frequency band used for the wireless local area network connection. In step 908, the mobile wireless communication device 100 determines if the WLAN connection is in "ad hoc" mode, in which case a communication device on either end of the WLAN "ad hoc" connection can request changes to the WLAN communication link. An "ad hoc" WLAN connection can be regarded as a form of "peer to peer" communication. If not in "ad hoc" mode, then the mobile wireless communication device 100 in step 914 determines if proprietary communication is possible with a WLAN partner on the other side of the WLAN connection. If the WLAN connection is in "ad hoc" mode or "proprietary" communication is possible, then the mobile wireless communication device 100 can request in step 910 that the WLAN partner move to a different frequency channel. The new frequency channel can be less impacted by performance, and therefore using the new frequency channel can mitigate the effect of interference from the wireless cellular connection into the WLAN channel.

If the WLAN connection is not in ad hoc mode and if no proprietary communication exists between the mobile wireless communication device 100 and the WLAN partner, then typically the mobile wireless communication device 100 cannot shift the frequency channels used by the WLAN connection. The choice of which frequency channels to use can be controlled by the WLAN access point rather than by the client mobile wireless communication device 100. The mobile wireless communication device 100 can, however, in step 916 determine if a second WLAN partner exists within communication range that uses a WLAN frequency channel that can be less performance impacted than the current WLAN frequency channel by interference from the wireless cellular connection. If so, then in step 918, the mobile wireless communication device can connect to the second WLAN partner (e.g. can form a connection with a different WLAN access point). The cycle of evaluating for interference can then be repeated with the newly connected WLAN partner.

Various aspects of the described embodiments can be implemented by software, hardware or a combination of hardware and software. The described embodiments can also be embodied as computer program code encoded on a non-transitory computer readable medium The non-transitory computer readable medium is any data storage device that can store data which can thereafter be read by a computer system. Examples of the non-transitory computer readable medium include read-only memory, random-access memory, CD-ROMs, DVDs, magnetic tape and optical data storage devices. The computer program code can also be distributed over network-coupled computer systems so that the computer program code is stored and executed in a distributed fashion.

The various aspects, embodiments, implementations or features of the described embodiments can be used separately or in any combination. The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of mitigating interference in a mobile wireless communication device, the method comprising:
    estimating a performance impact to signals received by a first transceiver of the mobile wireless communication device through a Bluetooth connection that uses a first frequency band from signals transmitted by a second transceiver of the mobile wireless communication device through a wireless cellular connection;
    changing the Bluetooth connection to exclude a portion of the first frequency band used by the first transceiver based on the performance impact estimation; and
    repeating periodically the estimating and changing while the Bluetooth and wireless cellular connections are active;
    wherein the first frequency band of the Bluetooth connection used by the first wireless transceiver is separate from a second frequency band of the wireless cellular connection used by the second wireless transceiver; and
    wherein higher order harmonics of transmissions in the second frequency band of the wireless cellular connection output by the second transceiver overlap at least a portion of the first frequency band of the Bluetooth connection received by the first transceiver; and
    wherein estimating the performance impact to signals received by the first transceiver through the Bluetooth connection by signals transmitted by the second transceiver through the wireless cellular connection depends on
    a power level of signals transmitted by the second transceiver,
    an amount of radio frequency antenna isolation between the first and second transceivers, and
    a receiver sensitivity requirement of the first transceiver.

2. The method as recited in claim 1 further comprising:
    changing the Bluetooth connection to re-use at least a part of previously excluded portions of the first frequency band used by the first transceiver when the wireless cellular connection is not active or when the wireless cellular connection changes a second frequency band at which the wireless cellular connection operates.

3. The method as recited in claim 2 wherein changing the Bluetooth connection to re-use at least the part of previously excluded portions of the first frequency band includes marking at least one frequency channel in an adaptive frequency hopping map for the Bluetooth connection as suitable for transmission.

4. The method as recited in claim 1 wherein a periodicity of the repeating depends on the method by which the mobile wireless communication device is powered and the amount of stored power available in the mobile wireless communication device.

5. The method as recited in claim 1 wherein changing the Bluetooth connection to exclude the portion of the first frequency band includes marking at least one of a plurality of frequency channels in an adaptive frequency hopping map for the Bluetooth connection as unsuitable for transmission.

6. The method as recited in claim 1 wherein estimating the performance further depends on the modulation type of the wireless cellular connection.

7. A method of mitigating interference in a mobile wireless communication device, the method comprising:
    estimating a performance impact to signals received by a first transceiver of the mobile wireless communication device through a Bluetooth connection that uses a first frequency band from signals transmitted by a second transceiver of the mobile wireless communication device through a wireless cellular connection;
    changing the Bluetooth connection to exclude a portion of the first frequency band used by the first transceiver based on the performance impact estimation; and
    repeating periodically the estimating and changing while the Bluetooth and wireless cellular connections are active;
    wherein the first frequency band of the Bluetooth connection used by the first wireless transceiver is separate from a second frequency band of the wireless cellular connection used by the second wireless transceiver; and wherein higher order harmonics of transmissions in the second frequency band of the wireless cellular connection output by the second transceiver overlap at least a portion of the first frequency band of the Bluetooth connection received by the first transceiver; and wherein estimating the performance impact to signals received by the first transceiver through the Bluetooth connection by signals transmitted by the second transceiver through the wireless cellular connection depends on a power control state of the Bluetooth connection, a connection state of the Bluetooth connection, and a number of Bluetooth frequency channels in the Bluetooth connection available for transmission.

8. A method of mitigating interference in a mobile wireless communication device, the method comprising:

estimating a performance impact to signals received by a first transceiver of the mobile wireless communication device through a Bluetooth connection that uses a first frequency band from signals transmitted by a second transceiver of the mobile wireless communication device through a wireless cellular connection;

changing the Bluetooth connection to exclude a portion of the first frequency band used by the first transceiver based on the performance impact estimation; and repeating periodically the estimating and changing while the Bluetooth and wireless cellular connections are active;

wherein the first frequency band of the Bluetooth connection used by the first wireless transceiver is separate from a second frequency band of the wireless cellular connection used by the second wireless transceiver; and wherein higher order harmonics of transmissions in the second frequency band of the wireless cellular connection output by the second transceiver overlap at least a portion of the first frequency band of the Bluetooth connection received by the first transceiver; and wherein estimating the performance impact to signals received by the first transceiver through the Bluetooth connection by signals transmitted by the second transceiver through the wireless cellular connection depends on a packet type of the Bluetooth connection, and a profile of the Bluetooth connection.

9. A mobile wireless communication device, comprising:

a first transceiver that receives signals through a Bluetooth connection;

a second transceiver that transmits signals through a wireless cellular connection; and a control processor coupled to the first and second transceivers, wherein the control processor mitigates interference in the mobile wireless communication device by:

estimating a performance impact to signals received by the first transceiver in a first frequency band from signals transmitted by the second transceiver;

changing the Bluetooth connection to exclude a portion of the first frequency band used by the first transceiver based on the performance impact estimation; and repeating periodically the estimating and changing while the Bluetooth and wireless cellular connections are active;

wherein the first frequency band of the Bluetooth connection used by the first wireless transceiver is separate from a second frequency band of the wireless cellular connection used by the second wireless transceiver, and higher order harmonics of transmissions in the second frequency band of the wireless cellular connection output by the second transceiver overlap at least a portion of the first frequency band of the Bluetooth connection received by the first transceiver; and wherein the control processor estimates the performance impact to signals received by the first transceiver through the Bluetooth connection by signals transmitted by the second transceiver through the wireless cellular connection using a power level of signals transmitted by the second transceiver, an amount of radio frequency antenna isolation between the first and second transceivers, and a receiver sensitivity requirement of the first transceiver.

10. The mobile wireless communication device as recited in claim 9 further comprising:

wherein the control processor further mitigates interference in the mobile wireless communication device by:

changing the Bluetooth connection to re-use at least a part of previously excluded portions of the first frequency band used by the first transceiver when the wireless cellular connection is not active or when the wireless cellular connection changes a second frequency band at which the wireless cellular connection operates.

11. The mobile wireless communication device as recited in claim 9 wherein a periodicity at which the control processor repeats the estimating and changing depends on the method by which the mobile wireless communication device is powered and the amount of stored power available in the mobile wireless communication device.

12. The mobile wireless communication device as recited in claim 9 wherein the control processor changes the Bluetooth connection to not use the portion of the first frequency band by marking at least one of a plurality of frequency channels in an adaptive frequency hopping map for the Bluetooth connection as unsuitable for transmission.

13. A mobile wireless communication device, comprising:

a first transceiver that receives signals through a Bluetooth connection;

a second transceiver that transmits signals through a wireless cellular connection; and a control processor coupled to the first and second transceivers, wherein the control processor mitigates interference in the mobile wireless communication device by:

estimating a performance impact to signals received by the first transceiver in a first frequency band from signals transmitted by the second transceiver;

changing the Bluetooth connection to exclude a portion of the first frequency band used by the first transceiver based on the performance impact estimation; and repeating periodically the estimating and changing while the Bluetooth and wireless cellular connections are active;

wherein the first frequency band of the Bluetooth connection used by the first wireless transceiver is separate from a second frequency band of the wireless cellular connection used by the second wireless transceiver, and higher order harmonics of transmissions in the second frequency band of the wireless cellular connection output by the second transceiver overlap at least a portion of the first frequency band of the Bluetooth connection received by the first transceiver; and wherein the control processor estimates the performance impact to signals received by the first transceiver through the Bluetooth connection by signals transmitted by the second transceiver through the wireless cellular connection depends on a power control state of the Bluetooth connection, a connection state of the Bluetooth connection, and a number of Bluetooth frequency channels in the Bluetooth connection available for transmission.

14. A non-transitory computer readable medium for storing computer program code executable by a processor for mitigating interference in a mobile wireless communication device comprising:

computer program code for estimating a performance impact to signals received by a first transceiver of the mobile wireless communication device through a Bluetooth connection using a first frequency band from signals transmitted by a second transceiver of the mobile wireless communication device through a wireless cellular connection;

computer program code for changing the Bluetooth connection to exclude a portion of the first frequency band used by the first transceiver based on the performance impact estimation.

computer program code for periodically repeating the estimating the performance impact and changing the Bluetooth connection while the Bluetooth and wireless cellular connections are active;

computer program code for estimating an amount of interference received by the first transceiver in the first frequency band based on a power level and modulation type of signals transmitted by the second transceiver over the wireless cellular connection, and an amount of radio frequency antenna isolation between the first and second transceivers; and computer program code for estimating the performance impact of the interference based on a receiver sensitivity requirement of the first transceiver.

15. The computer readable medium as recited in claim 14 further comprising:

computer program code for changing the Bluetooth connection to re-use at least a part of previously excluded portions of the first frequency band used by the first transceiver when the wireless cellular connection is not active or when the wireless cellular connection changes a second frequency band at which the wireless cellular connection operates.

16. A non-transitory computer readable medium for storing computer program code executable by a processor for mitigating interference in a mobile wireless communication device comprising:

computer program code for estimating a performance impact to signals received by a first transceiver of the mobile wireless communication device through a Bluetooth connection using a first frequency band from signals transmitted by a second transceiver of the mobile wireless communication device through a wireless cellular connection;

computer program code for changing the Bluetooth connection to exclude a portion of the first frequency band used by the first transceiver based on the performance impact estimation;

computer program code for periodically repeating the estimating the performance impact and changing the Bluetooth connection while the Bluetooth and wireless cellular connections are active; and computer program code for estimating the performance impact of interference received by the first transceiver from signals transmitted by the second transceiver based on a power control state of the Bluetooth connection, a connection state of the Bluetooth connection, and a number of Bluetooth frequency channels in the Bluetooth connection available for transmission.

17. The computer readable medium as recited in claim 16 further comprising:

computer program code for changing the Bluetooth connection to re-use at least a part of previously excluded portions of the first frequency band used by the first transceiver when the wireless cellular connection is not active or when the wireless cellular connection changes a second frequency band at which the wireless cellular connection operates.

* * * * *

UNITED STATES PATENT AND TRADEMARK OFFICE
CERTIFICATE OF CORRECTION

| | |
|---|---|
| PATENT NO. | : 8,238,831 B2 |
| APPLICATION NO. | : 12/748230 |
| DATED | : August 7, 2012 |
| INVENTOR(S) | : Indranil Sen |

It is certified that error appears in the above-identified patent and that said Letters Patent is hereby corrected as shown below:

In the Claims
Column 14, line 29 (Claim 2, line 6): "a second" should read --the second--.
Column 14, line 39 (Claim 4, line 3): "the amount" should read --an amount--.
Column 14, line 48 (Claim 6, line 2): "the modulation" should read --a modulation--.
Column 14, line 53 (Claim 7, line 4): "first transceiver" should read --first wireless transceiver--.
Column 14, lines 55-56 (Claim 7, lines 6-7): "second transceiver" should read --second wireless transceiver--.
Column 14, line 59 (Claim 7, line 10): "first transceiver" should read --first wireless transceiver--.
Column 15, line 3 (Claim 7, line 21): "second transceiver" should read --second wireless transceiver--.
Column 15, line 5 (Claim 7, line 23): "first transceiver" should read --first wireless transceiver--.
Column 15, line 7 (Claim 7, line 25): "first transceiver" should read --first wireless transceiver--.
Column 15, line 8 (Claim 7, line 26): "second transceiver" should read --second wireless transceiver--.
Column 15, line 19 (Claim 8, line 4): "first transceiver" should read --first wireless transceiver--.
Column 15, lines 21-22 (Claim 8, lines 6-7): "second transceiver" should read --second wireless transceiver--.
Column 15, line 25 (Claim 8, line 10): "first transceiver" should read --first wireless transceiver--.
Column 15, line 36 (Claim 8, line 21): "second transceiver" should read --second wireless transceiver--.
Column 15, line 38 (Claim 8, line 23): "first transceiver" should read --first wireless transceiver--.
Column 15, line 40 (Claim 8, line 25): "first transceiver" should read --first wireless transceiver--.
Column 15, line 41 (Claim 8, line 26): "second transceiver" should read --second wireless transceiver--.
Column 15, line 49 (Claim 9, line 4): "second transceiver" should read --second wireless transceiver--.
Column 15, line 51 (Claim 9, line 6): "second transceiver" should read --second wireless transceiver--.
Column 15, line 56 (Claim 9, line 11): "first transceiver" should read --first wireless transceiver--.
Column 15, line 57 (Claim 9, line 12): "second transceiver" should read --second wireless transceiver--.
Column 15, line 59 (Claim 9, line 14): "first transceiver" should read --first wireless transceiver--.
Column 15, line 62 (Claim 9, line 17): "connections" should read --connection--.

Signed and Sealed this
Third Day of March, 2015

Michelle K. Lee
*Deputy Director of the United States Patent and Trademark Office*

CERTIFICATE OF CORRECTION (continued)
U.S. Pat. No. 8,238,831 B2

Column 16, line 3 (Claim 9, line 25): "second transceiver" should read --second wireless transceiver--.
Column 16, line 5 (Claim 9, line 27): "first transceiver" should read --first wireless transceiver--.
Column 16, line 7 (Claim 9, line 29): "first transceiver" should read --first wireless transceiver--.
Column 16, line 9 (Claim 9, line 31): "second transceiver" should read --second wireless transceiver--.
Column 16, line 11 (Claim 9, line 33): "second transceiver" should read --second wireless transceiver--.
Column 16, line 14 (Claim 9, line 36): "second transceiver" should read --second wireless transceiver--.
Column 16, line 15 (Claim 9, line 37): "first transceiver" should read --first wireless transceiver--.
Column 16, line 23 (Claim 10, line 7): "first transceiver" should read --first wireless transceiver--.
Column 16, line 25 (Claim 10, line 9): "a second" should read --the second--.
Column 16, line 31 (Claim 11, line 5): "the amount" should read --an amount--.
Column 16, line 40 (Claim 13, line 2): "first transceiver" should read --first wireless transceiver--.
Column 16, line 42 (Claim 13, line 4): "second transceiver" should read --second wireless transceiver--.
Column 16, line 44 (Claim 13, line 6): "second transceiver" should read --second wireless transceiver--.
Column 16, line 49 (Claim 13, line 11): "first transceiver" should read --first wireless transceiver--.
Column 16, line 50 (Claim 13, line 12): "second transceiver" should read --second wireless transceiver--.
Column 16, line 52 (Claim 13, line 14): "first transceiver" should read --first wireless transceiver--.
Column 16, line 63 (Claim 13, line 25): "second transceiver" should read --second wireless transceiver--.
Column 16, line 65 (Claim 13, line 27): "first transceiver" should read --first wireless transceiver--.
Column 16, line 67 (Claim 13, line 29): "first transceiver" should read --first wireless transceiver--.
Column 17, line 2 (Claim 13, line 31): "second transceiver" should read --second wireless transceiver--.